No. 607,887. Patented July 26, 1898.
C. E. SMITH.
MARKER FOR SEED OR CORN PLANTERS.
(Application filed Mar. 28, 1898.)
(No Model.)
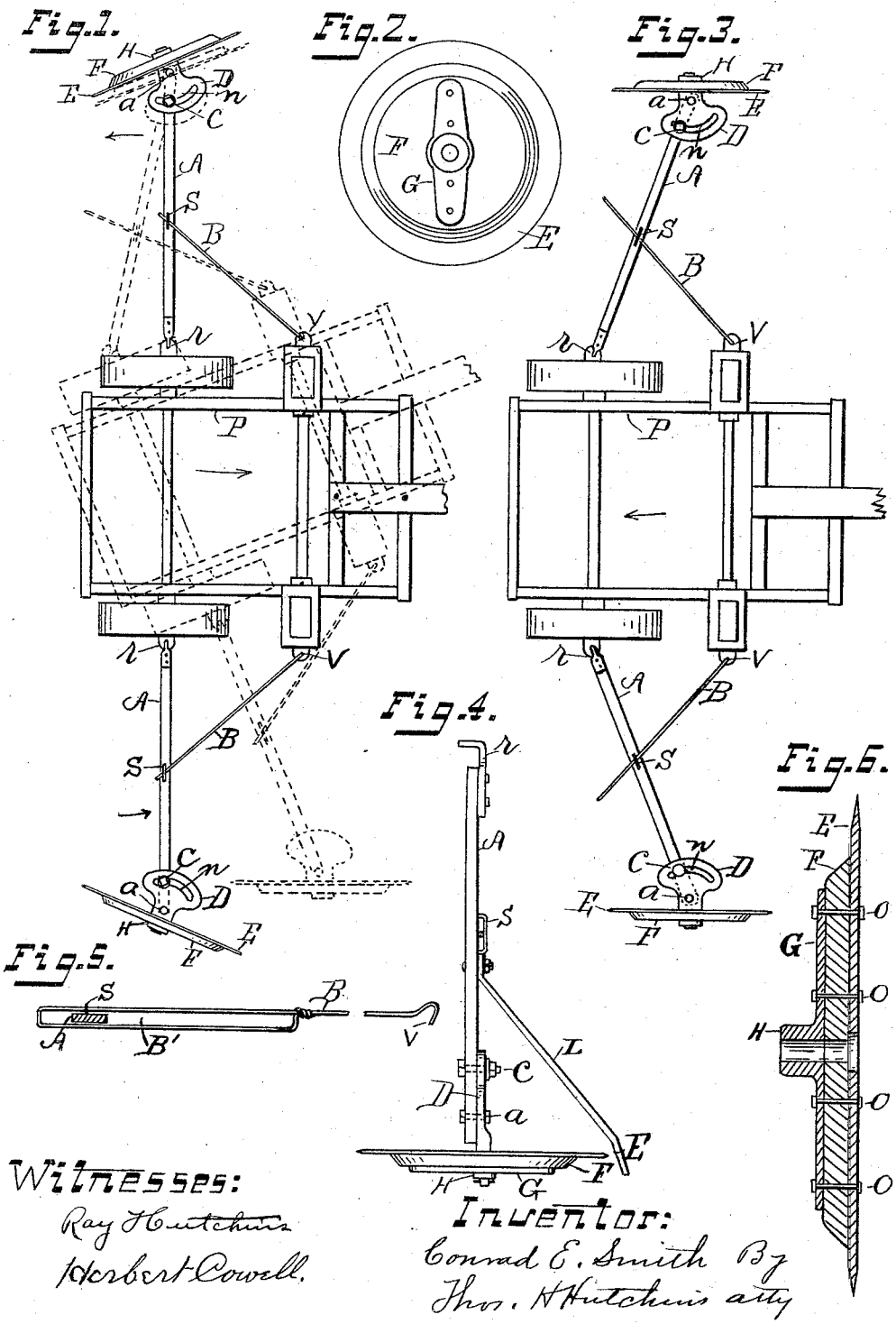

UNITED STATES PATENT OFFICE.

CONRAD E. SMITH, OF PLAINFIELD, ILLINOIS.

MARKER FOR SEED OR CORN PLANTERS.

SPECIFICATION forming part of Letters Patent No. 607,887, dated July 26, 1898.

Application filed March 28, 1898. Serial No. 675,399. (No model.)

*To all whom it may concern:*

Be it known that I, CONRAD E. SMITH, a citizen of the United States of America, residing at Plainfield, in the county of Will and State of Illinois, have invented certain new and useful Improvements in Markers for Seed or Corn Planters, of which the following is a specification.

This invention relates to certain improvements in markers for seed-planters of the class designed to be detachable therefrom and intended to be attached to an ordinary cornplanter, which improvements are fully set forth and explained in the following specification and claims, reference being had to the accompanying drawings and the letters thereon, forming a part of this specification, in which—

Figure 1 is a plan view of the marker attached to a planter and in broken lines, showing the relative position of the marker with the planter when being turned around at the end of the field. Fig. 2 is a side elevation, taken on the exterior, of one of the marker-wheels. Fig. 3 is a plan view of the marker attached to the planter, showing their relative positions when the planter is being backed. Fig. 4 is a plan view of the marker detached from the planter. Fig. 5 is a side view of the marker-brace detached from the planter, and Fig. 6 is a vertical cross-section of the marker-wheel.

Referring to the drawings, the planter is shown as having a marker attached to each side, each marker attachment being an exact duplicate of the other, so that a description of one will be sufficient for both. The marker consists of the bar A, having a hook *r* on its inner end adapted to hook into an eye in the outer end of the planter-axle. Its outer end is provided with an axle-plate D, pivotally attached at *a* to the bar A. Said axle-plate is provided with a segmental slot *n*, through which passes a bolt C, having a set-nut by means of which bolt and nut the said axle-plate D may be adjusted and held at any desired angle with the bar A and planter P for the purpose of setting the marker-wheel E F at an angle with the planter.

B is a brace made, preferably, of a metal rod, having a hook V on its inner end for attaching it to the planter P in an eye at about the seedbox, or it may be attached to any other desired place. The outer end of said brace is formed so as to have a long loop B', through which passes the marker-bar A, and is held in proper position on said bar, so far as movement lengthwise on the said bar is concerned, by means of a staple S; but said staple permits said brace to have end movement on said bar within the limits of the length of said loop D'.

The marker-wheel is constructed of a steel disk E, having a sharpened periphery, and a wooden disk F, having a beveled periphery and of less diameter than said metal disk, and is secured to said metal disk by means of bolts O, passing through said two disks, and a plate G, arranged on the outer side of said wooden disk F, as shown particularly in Fig. 6, said plate G having a hub H for fitting on the axle of the axle-plate D. It is intended to set the marker-wheels at an angle with the planter when it is desired to use the markers, and the full lines in Fig. 1 show the position of the marker-wheels with relation to the planter when the markers are attached to the planter and are ready for operation. The marker-wheels are placed on the marker-arms so the metal disk E of the marker-wheel is toward the planter. It is intended to not set them at so great an angle with the planter as to prevent their turning as the planter advances, but the angle may be changed to suit the kind of ground being marked. The angle given the marker-wheels causes them to make a more distinct and better mark than if they were set parallel with the planter. By this construction of marker-wheel greater strength and durability is obtained and the thicker wood disk F prevents the marker-wheel from sinking too deep either in very wet or very dry and loose ground. When the planter has reached the end of the field and it is desired to turn about in either direction, the marker-bar on the side of the machine toward which it is turning is permitted to remain stationary at its outer end by means of said bar passing through the loop B' of the brace B until the machine has turned, as shown by the broken lines in Fig. 1, and caused the marker-wheel to be parallel with the machine. The marker-wheel will then roll around backward and permit the machine to turn and not break the marker-wheel or its axle. The brace B slides on the marker-bar within the limits of its loop B' and permits the machine to turn so it and the marker-wheel may come to be parallel with each other. The marker-wheel on the opposite side of the machine will not be injured by being moved forward to turn around.

When it is desired to back up the planter for any purpose, the braces B will permit the marker-bars to turn until the marker-wheels are parallel with the planter, as shown in Fig. 3, so they will roll backward in that position and not be injured and not retard the machine from being moved backward, as would be the case if they were at an angle with the machine.

The marker attachment may be easily detached from the machine when desired, and only one may be used at a time, if desired, and the attachment may be attached to almost all of the planters of this class now in use. When only one of the markers are to be used, the other may be folded up so as to have its outer end lie on the forward part of the machine or on the seedbox simply by unhooking the brace B, so as to leave the outer end of the bar A free, and they may both be thus folded when traveling on the road to or from the field.

When a check-rower wire is used with the machine, it must be detached therefrom when it is desired to turn the machine around at the end of the field, and when so detached it will fall necessarily on one of the marker-arms A and catch on the marker-wheel when the machine is turning around, unless means were provided for carrying the wire over the marker-wheel. For the purpose of conducting the wire over the marker-wheel, the marker-bar A is provided with a curved guard-arm L, having its outer end extending out over the marker-wheel, so a check-rower wire will be carried over the marker-wheel and dropped on the ground free from the machine.

Having thus described my invention, what I claim as new, and desire to secure by Letters Patent, is as follows:

1. The marker attachment for corn and seed planters consisting of the combination of the bar A, brace B having the loop B' for receiving said bar, the axle-plate D pivotally attached to the outer end of said bar, and the means for adjusting its angle thereon, the marker-wheel arranged on said axle-plate and comprising the metal disk E, wooden disk F and plate G, and the means for detachably connecting said parts to a planter substantially as and for the purpose set forth.

2. In the marker attachment shown and described the combination of the marker-bar A, marker-wheel E, F, G pivotally attached to the outer end of said marker-arm, and the guard-arm L attached to said bar and extending out over said marker-wheel all arranged to operate substantially as and for the purpose set forth.

3. The marker attachment for corn and seed planters consisting of the combination of the bar A, brace B having the loop B' for receiving said bar, the axle-plate D pivotally attached to the outer end of said bar, and the means for adjusting its angle thereon, the marker-wheel arranged on said axle-plate, and the means for detachably connecting said parts to a planter, substantially as and for the purpose set forth.

4. The marker attachment for corn and seed planters consisting of the combination of the bar A, brace B having an elongated loop on its inner end for receiving said bar, the axle-plate pivotally attached to the outer end of said bar, and the means for adjusting its angle thereon, the marker-wheel arranged on the axle of said plate, the guard-arm L, and the means for detachably connecting said parts to a planter, substantially as and for the purpose set forth.

CONRAD E. SMITH.

Witnesses:
   THOS. H. HUTCHINS,
   HERBERT COWELL.